United States Patent
Chen et al.

(10) Patent No.: US 11,900,563 B2
(45) Date of Patent: Feb. 13, 2024

(54) COMPUTER-IMPLEMENTED METHOD, APPARATUS, AND COMPUTER-PROGRAM PRODUCT

(71) Applicant: BOE Technology Group Co., Ltd., Beijing (CN)

(72) Inventors: Guannan Chen, Beijing (CN); Jingru Wang, Beijing (CN); Lijie Zhang, Beijing (CN); Fengshuo Hu, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 220 days.

(21) Appl. No.: 17/261,541

(22) PCT Filed: Apr. 1, 2020

(86) PCT No.: PCT/CN2020/082722
§ 371 (c)(1),
(2) Date: Jan. 19, 2021

(87) PCT Pub. No.: WO2021/196070
PCT Pub. Date: Oct. 7, 2021

(65) Prior Publication Data
US 2022/0108425 A1    Apr. 7, 2022

(51) Int. Cl.
*G06T 3/40* (2006.01)
*G06N 3/08* (2023.01)

(52) U.S. Cl.
CPC ............ *G06T 3/4053* (2013.01); *G06N 3/08* (2013.01); *G06T 3/4046* (2013.01)

(58) Field of Classification Search
None
See application file for complete search history.

(56) References Cited

U.S. PATENT DOCUMENTS

| 9,367,897 B1 | 6/2016 | Chen et al. |
| 10,489,887 B2 | 11/2019 | El-Khamy et al. |

(Continued)

FOREIGN PATENT DOCUMENTS

| CN | 109064405 A | * 12/2018 |
| CN | 109949224 A |   6/2019 |

(Continued)

OTHER PUBLICATIONS

A. Lucas, A. K. Katsaggelos, S. Lopez-Tapuia and R. Molina, "Generative Adversarial Networks and Perceptual Losses for Video Super-Resolution," 2018 25th IEEE International Conference on Image Processing (ICIP), Athens, Greece, 2018, pp. 51-55, doi: 10.1109/ICIP.2018.8451714.*

(Continued)

*Primary Examiner* — Jiangeng Sun
(74) *Attorney, Agent, or Firm* — Intellectual Valley Law, P.C.

(57) ABSTRACT

A computer-implemented method is provided. The computer-implemented method includes inputting a low-resolution image into a generator; and generating a high-resolution image using the generator based on the low-resolution image. Generating the high-resolution image includes processing the low-resolution image through a plurality of super-resolution generating units arranged in series in the generator. A respective output from a respective one of the plurality of super-resolution generating units has a respective increased image resolution as compared to a respective input to the respective one of the plurality of super-resolution generating units.

18 Claims, 10 Drawing Sheets

(56) References Cited

U.S. PATENT DOCUMENTS

| | | | | |
|---|---|---|---|---|
| 2011/0221966 | A1* | 9/2011 | Hsieh | G06T 3/4053 |
| | | | | 348/665 |
| 2019/0096035 | A1* | 3/2019 | Li | G06T 3/4053 |
| 2019/0130530 | A1* | 5/2019 | Schroers | G06T 3/4007 |
| 2019/0259136 | A1* | 8/2019 | Shpalensky | G06V 40/103 |
| 2019/0369191 | A1* | 12/2019 | Gong | A61B 5/055 |
| 2020/0273167 | A1* | 8/2020 | Wilson | G06V 10/82 |
| 2020/0311871 | A1 | 10/2020 | Yu et al. | |
| 2020/0364831 | A1* | 11/2020 | Ozeki | H04N 7/01 |

FOREIGN PATENT DOCUMENTS

| | | | |
|---|---|---|---|
| CN | 109949255 | A | 6/2019 |
| CN | 109977832 | A * | 7/2019 |
| CN | 110148085 | A | 8/2019 |
| CN | 110263756 | A | 9/2019 |
| CN | 110298791 | A | 10/2019 |
| JP | 2014044497 | A | 3/2014 |

OTHER PUBLICATIONS

International Search Report & Written Opinion dated Dec. 30, 2020, regarding PCT/CN2020/082722.

First Office Action in the Indian Patent Application No. 202147054110, dated Nov. 11, 2021.

Extended European Search Report in the European Patent Application No. 20924969.7, dated May 10, 2023.

Y. Wang et al.: "A fully Progressive Approach to Single-Image Super-Resolution", ARXIV.org, Cornell University Library, 201 OLIN Library Cornell University Ithaca, NY 14853, Apr. 9, 2018, XP080868823.

D. Zhou et al.: "Single Image Super-resolution Reconstruction Based on Multi-scale Feature Mapping Adversarial Network", Signal Processing, Elsevier, Amsterdam, NL, vol. 166, Aug. 5, 2019, XP085839974, ISSN: 0165-1684, DOI: 10.1016/J.SIGPRO. 2019.107251.

\* cited by examiner

COMPUTER-IMPLEMENTED METHOD, APPARATUS, AND COMPUTER-PROGRAM PRODUCT

CROSS-REFERENCE TO RELATED APPLICATION

This application is a national stage application under 35 U.S.C. § 371 of International Application No. PCT/CN2020/082722, filed Apr. 1, 2020, the contents of which are incorporated by reference in the entirety.

TECHNICAL FIELD

The present invention relates to display technology, more particularly, to a computer-implemented method, an apparatus, and a computer-program product.

BACKGROUND

Machine learning and neural networks have been used to analyze images for a variety of purposes. A neural network is a network including a plurality of hidden layers. A respective one of the plurality of hidden layers includes a plurality of neurons (e.g. nodes). A plurality of neurons in a respective one of the plurality of hidden layers are connected with a plurality of neurons in an adjacent one of the plurality of hidden layers. Connects between neurons have different weights. The neural network has a structure that mimics a structure of a biological neural network. The neural network can solve problems using a non-deterministic manner.

SUMMARY

In one aspect, the present disclosure provides a computer-implemented method, comprising inputting a low-resolution image into a generator; and generating a high-resolution image using the generator based on the low-resolution image; wherein generating the high-resolution image comprises processing the low-resolution image through a plurality of super-resolution generating units arranged in series in the generator, wherein a respective output from a respective one of the plurality of super-resolution generating units has a respective increased image resolution as compared to a respective input to the respective one of the plurality of super-resolution generating units.

Optionally, the respective one of the plurality of super-resolution generating units comprises a super-resolution generating block and a bilinear interpolation block; wherein generating the high-resolution image using the generator further comprises inputting a respective input to the super-resolution generating block and the bilinear interpolation block, respectively; processing the respective input using the super-resolution generating block to generate a first intermediate output from the super-resolution generating block; inputting the first intermediate output from the super-resolution generating block to the bilinear interpolation block; and generating a second intermediate output using the bilinear interpolation block based on the respective input and the first intermediate output.

Optionally, the respective one of the plurality of super-resolution generating units further comprises a concatenation block; wherein generating the high-resolution image using the generator further comprises inputting the second intermediate output to the concatenation block; and generating the respective output from the concatenation block based on the second intermediate output.

Optionally, the super-resolution generating block comprises a plurality of encoding modules and a plurality of decoding modules arranged in a u-net architecture; a respective one of the plurality of encoding modules comprises a down-sampling convolutional layer, and a plurality of first residual blocks arranged in series; and a respective one of the plurality of decoding modules comprises a plurality of second residual blocks arranged in series, and an up-sampling convolutional layer.

Optionally, generating the high-resolution image using the generator further comprises inputting an output from a last one of the plurality of super-resolution generating units arranged in series into an additional super-resolution generating block; and processing the output from the last one of the plurality of super-resolution generating units using the additional super-resolution generating block to generate the high-resolution image.

Optionally, the computer-implemented method further comprises using a feedback loop to train the generator based on a generator loss function.

Optionally, the generator loss function is defined as $$L_{total} = \sum_{k=0}^{m}(\alpha L_i^m + \beta L_i^\varphi);$$

wherein i stands for a respective number of a plurality of scales; $L^m$ is a mean square error function; $L^\varphi$ is a perceptual loss function; $\alpha$ stands for a weight coefficient for $L^m$; and $\beta$ stands for a weight coefficients for $L^\varphi$.

Optionally, a neural network model is used to process a reference image and the high-resolution image;

$$L^m = \min\sum_{j=0}^{N}\frac{1}{N}\|I_j - \hat{I}_j\|_2^2; \text{ and}$$

$$L_j^\varphi(\hat{I}, I) = \frac{1}{C_j H_j W_j}\|\varphi_j(\hat{I}) - \varphi_j(I)\|_2^2;$$

wherein I stands for the reference image; $\hat{I}$ stands for the high-resolution image; $\varphi$ stands for the neural network model; j stands for a respective one of a plurality of output layers of the neural network model; C stands for a number of channels of a feature map outputted from the respective one of a plurality of output layers; H stands for a height of the feature map outputted from the respective one of a plurality of output layers; and W stands for a width of the feature map outputted from the respective one of a plurality of output layers.

Optionally, the neural network model is a VGG-19 model.

Optionally, the computer-implemented method further comprises pre-training a convolutional neural network by inputting a plurality of training low-resolution images into the convolutional neural network; inputting a plurality of training reference images into the convolutional neural network; generating a plurality of training high-resolution images using the generator respectively based on the plurality of training low-resolution images; computing loss for the plurality of training high-resolution images respectively based on the generator loss function; and tuning the convolutional neural network based on the loss.

Optionally, the computer-implemented method further comprises inputting a reference image and the high-resolution image into a discriminator; and verifying the high-resolution image using the discriminator based on the reference image; wherein the generator and the discriminator are components of a generative adversarial network (GAN).

Optionally, verifying the high-resolution image comprises processing the high-resolution image through a plurality of convolutional layers arranged in series, and a fully connection layer.

Optionally, the computer-implemented method further comprises using a feedback loop to mutually train the generator and the discriminator of the GAN, based on a generator loss function and a discriminator loss function.

Optionally, the generator loss function is defined as $$\min V(D, G) = \sum_{k=0}^{3} \alpha_i E_{x \sim P_z(z)}[\log(1 - D_i(G_i(z)))] + \beta_i L_i^p;$$

and the discriminator loss function is defined as $$\max V(D, G) = \sum_{k=0}^{3} a_i E_{x \sim P_{data}(x)}[\log(D_i(x))] + E_{x \sim P_z(z)}[\log(1 - D_i(G_i(z)))];$$

wherein D stands for the discriminator; G stands for the generator; i stands for a respective number of a plurality of scales; $\alpha_i$ and $\beta_i$ stand for weight coefficients corresponding to the respective number of a plurality of scales; E stands for a probability density distribution; $L_i^p$ is a perceptual loss function; $P_{data}(x)$ stands for a probability distribution of the reference image; x stands for a sample from $P_{data}(x)$; $P_z(z)$ stands for a probability distribution of the high-resolution image; and z stands for a sample from $P_z(z)$.

Optionally, a neural network model is used to process a reference image and the high-resolution image; the perceptual loss function is calculated as follows $$L_j^\varphi(\hat{I}, I) = \frac{1}{C_j H_j W_j} \left\| \varphi_j(\hat{I}) - \varphi_j(I) \right\|_2^2;$$

wherein I stands for the reference image; Î stands for the high-resolution image; φ stands for the neural network model; j stands for a respective one of a plurality of output layers of the neural network model; C stands for a number of channels of a feature map outputted from the respective one of a plurality of output layers; H stands for a height of the feature map outputted from the respective one of a plurality of output layers; and W stands for a width of the feature map outputted from the respective one of a plurality of output layers.

Optionally, the neural network model is a VGG-19 model.

Optionally, the neural network model is a sphereNet model.

Optionally, the computer-implemented method further comprises pre-training a convolutional neural network by inputting a plurality of training low-resolution images into the convolutional neural network; inputting a plurality of training reference images into the convolutional neural network; generating a plurality of training high-resolution images using the generator respectively based on the plurality of training low-resolution images; computing generator loss for the plurality of training high-resolution images respectively based on the generator loss function; computing discriminator loss for the plurality of training high-resolution images respectively based on the discriminator loss function; and tuning the convolutional neural network based on the generator loss and the discriminator loss.

In another aspect, the present disclosure provides an apparatus, comprising a memory; and one or more processors; wherein the memory and the one or more processors are connected with each other; and the memory stores computer-executable instructions for controlling the one or more processors to input a low-resolution image into a generator; and generate a high-resolution image using the generator based on the low-resolution image by processing the low-resolution image through a plurality of super-resolution generating units arranged in series in the generator; wherein a respective output from a respective one of the plurality of super-resolution generating units has a respective increased image resolution as compared to a respective input to the respective one of the plurality of super-resolution generating units.

In another aspect, the present disclosure provides a computer-program product comprising a non-transitory tangible computer-readable medium having computer-readable instructions thereon, the computer-readable instructions being executable by a processor to cause the processor to perform inputting a low-resolution image into a generator; and generating a high-resolution image using the generator based on the low-resolution image; wherein generating the high-resolution image comprises processing the low-resolution image through a plurality of super-resolution generating units arranged in series in the generator, wherein a respective output from a respective one of the plurality of super-resolution generating units has a respective increased image resolution as compared to a respective input to the respective one of the plurality of super-resolution generating units.

BRIEF DESCRIPTION OF THE FIGURES

The following drawings are merely examples for illustrative purposes according to various disclosed embodiments and are not intended to limit the scope of the present disclosure.

DETAILED DESCRIPTION

The disclosure will now be described more specifically with reference to the following embodiments. It is to be noted that the following descriptions of some embodiments are presented herein for purpose of illustration and description only. It is not intended to be exhaustive or to be limited to the precise form disclosed.

Various methods of enhancing image resolution have been developed in recent years. These methods include, for example, those utilizing a neural network. It is discovered in the present disclosure that these related methods typically require a priori knowledge in order to perform the downstream image enhancement process. In one example, a related method requires a priori semantic feature extraction to obtain an image parsing map and an image landmark heatmap. In another example, a related method requires a priori knowledge of a subject in the image, such as sex, age, and facial expression of the subject. These related methods involve time-consuming computation processes, and often times the results are not satisfactory.

Accordingly, the present disclosure provides, inter alia, a computer-implemented method, an apparatus, and a computer-program product that substantially obviate one or more of the problems due to limitations and disadvantages of the related art. In one aspect, the present disclosure provides a computer-implemented method. In some embodiments, the computer-implemented method includes inputting a low-resolution image into a generator; and generating a high-resolution image using the generator based on the low-resolution image. Optionally, the step of generating the high-resolution image includes processing the low-resolution image through a plurality of super-resolution generating units arranged in series in the generator. Optionally, a respective output from the respective one of the plurality of super-resolution generating units has a respective increased image resolution as compared to a respective input to the respective one of the plurality of super-resolution generating units. The present method does not require a priori knowledge such as a priori semantic feature extraction or a priori knowledge input. As a result, the present method can generate high resolution images without a time-consuming computation process. Enhanced images with super-high definition and excellent detail restoration can be obtained by the present method.

Figure 1:
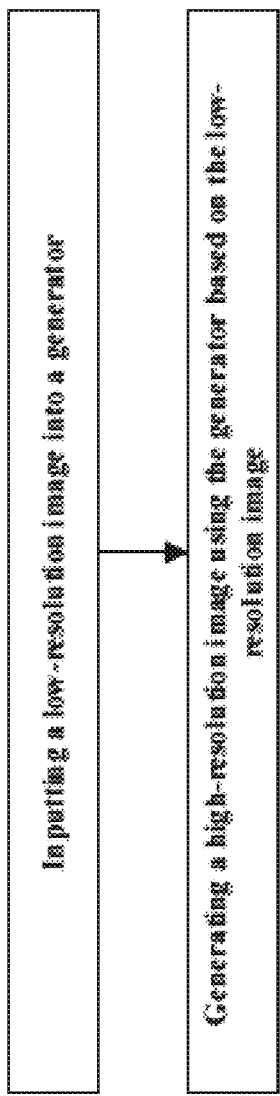
FIG. 1 is a flow chart illustrating a computer-implemented method in some embodiments according to the present disclosure.
Figure 2:
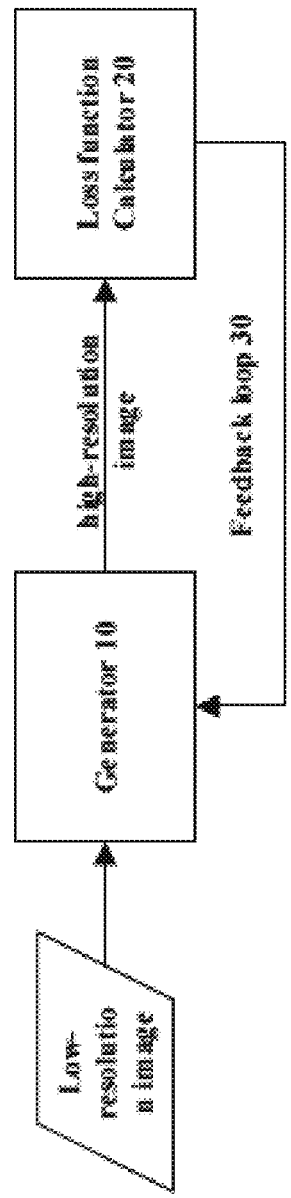
FIG. 2 is a schematic diagram illustrating the structure of an apparatus for implementing a computer-implemented method in some embodiments according to the present disclosure.

FIG. 1 is a flow chart illustrating a computer-implemented method in some embodiments according to the present disclosure. Referring to FIG. 1, the computer-implemented method in some embodiments includes inputting a low-resolution image into a generator; and generating a high-resolution image using the generator based on the low-resolution image. FIG. 2 is a schematic diagram illustrating the structure of an apparatus for implementing a computer-implemented method in some embodiments according to the present disclosure. Referring to FIG. 2, the apparatus for implementing a computer-implemented method in some embodiments includes a generator 10, a loss function calculator 20, and a feedback loop 30. The generator 10 is configured to receive a low-resolution image as an input, and output a high-resolution image to the loss function calculator 20. The loss function calculator 20 in some embodiments computes a generator loss function based on the high-resolution image. The feedback loop 30 is configured to train the generator 10 based on a generator loss function.

Figure 3:
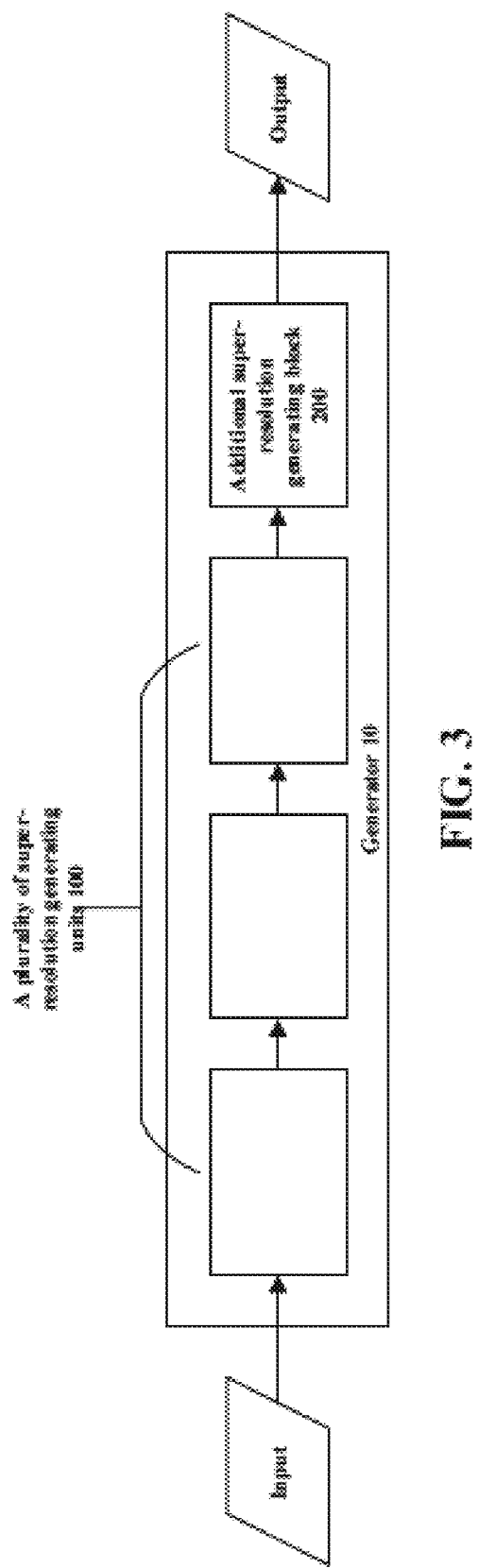
FIG. 3 is a schematic diagram illustrating the structure of a generator in some embodiments according to the present disclosure.

FIG. 3 is a schematic diagram illustrating the structure of a generator in some embodiments according to the present disclosure. Referring to FIG. 3, the generator 10 in some embodiments includes a plurality of super-resolution generating units 100 arranged in series. Optionally, the generator 10 includes N number of super-resolution generating units, wherein N 2. FIG. 3 shows an example of the generator 10 in which a total number of the plurality of super-resolution generating units 100 is three. Optionally, the generator 10 further includes an additional super-resolution generating block 200. Optionally, the additional super-resolution generating block 200 is configured to receive an input from a last one of the plurality of super-resolution generating units 100 arranged in series.

Accordingly, in some embodiments, the step of generating the high-resolution image includes processing the low-resolution image through a plurality of super-resolution generating units 100 arranged in series in the generator 10. Optionally, a respective output from a respective one of the plurality of super-resolution generating units 100 has a respective increased image resolution as compared to a respective input to the respective one of the plurality of super-resolution generating units 100. For example, each time the image is processes by one of the plurality of super-resolution generating units 100, the image resolution is increased by n times, wherein n>1. Optionally, n=2.

Figure 4:
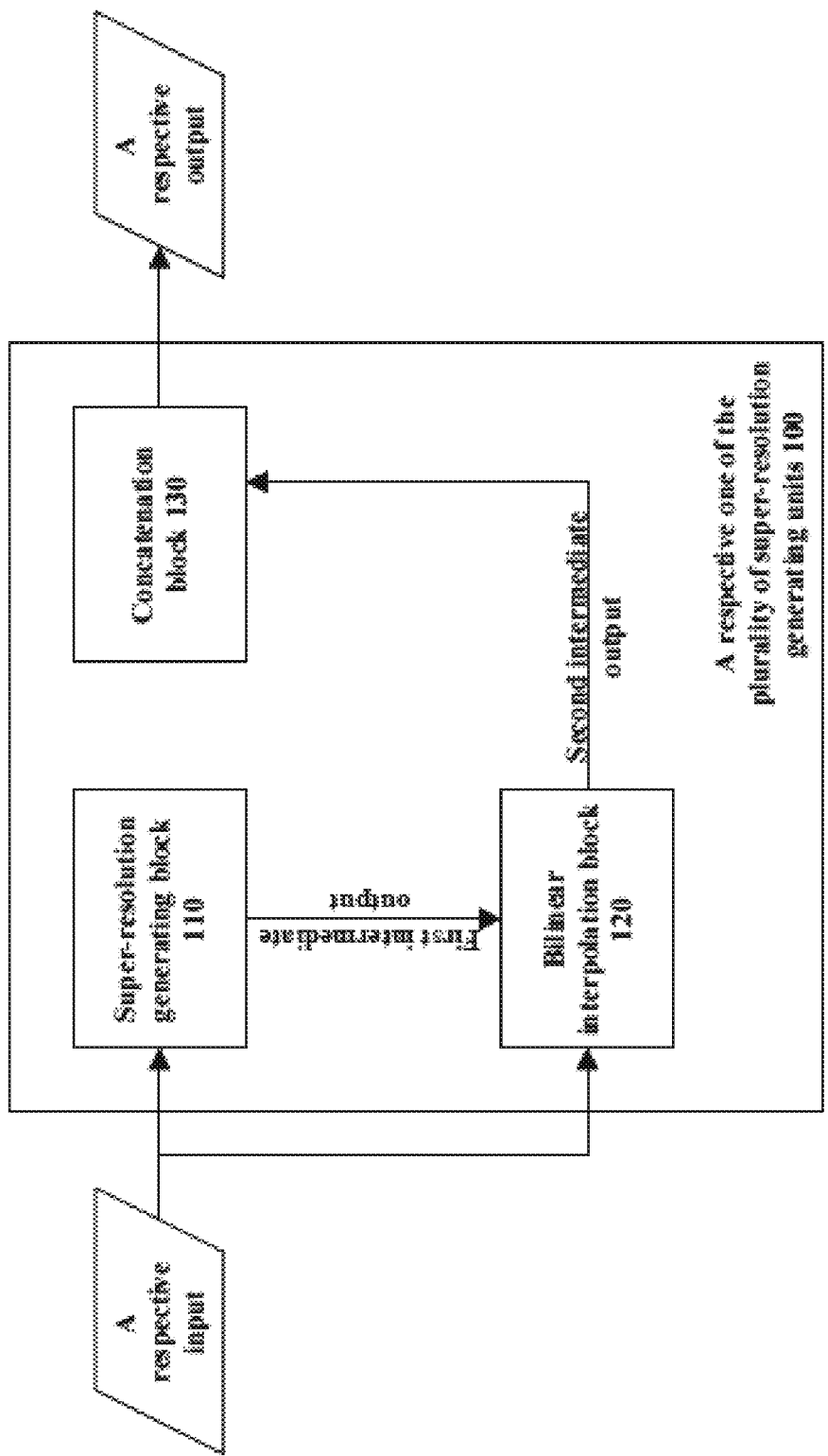
FIG. 4 is a schematic diagram illustrating the structure of a respective one of the plurality of super-resolution generating units in some embodiments according to the present disclosure.

FIG. 4 is a schematic diagram illustrating the structure of a respective one of the plurality of super-resolution generating units in some embodiments according to the present disclosure. Referring to FIG. 4, the respective one of the plurality of super-resolution generating units 100 in some embodiments includes a super-resolution generating block 110, a bilinear interpolation block 120, and a concatenation block 130. Accordingly, in some embodiments, the step of generating the high-resolution image using the generator further includes inputting a respective input to the super-resolution generating block 110 and the bilinear interpolation block 120, respectively; processing the respective input using the super-resolution generating block 110 to generate a first intermediate output from the super-resolution generating block 110; inputting the first intermediate output from the super-resolution generating block 110 to the bilinear interpolation block 120; generating a second intermediate output using the bilinear interpolation block 120 based on the respective input and the first intermediate output; inputting the second intermediate output to the concatenation block 130; and generating the respective output from the concatenation block 130 based on the second intermediate output.

In some embodiments, the bilinear interpolation block 120 performs a bilinear interpolation process. As used herein, bilinear interpolation refers to an interpolation method in which linear interpolation is two-dimensionally enlarged and an interpolation value weighted and averaged in accordance with a distance from each of the four pixels around one pixel to the interpolation object pixel is taken as a pixel value of the interpolation object pixel. In one example, the bilinear interpolation block 120 is a 2× bilinear interpolation block, in which the linear interpolation is two times enlarged.

Figure 5:
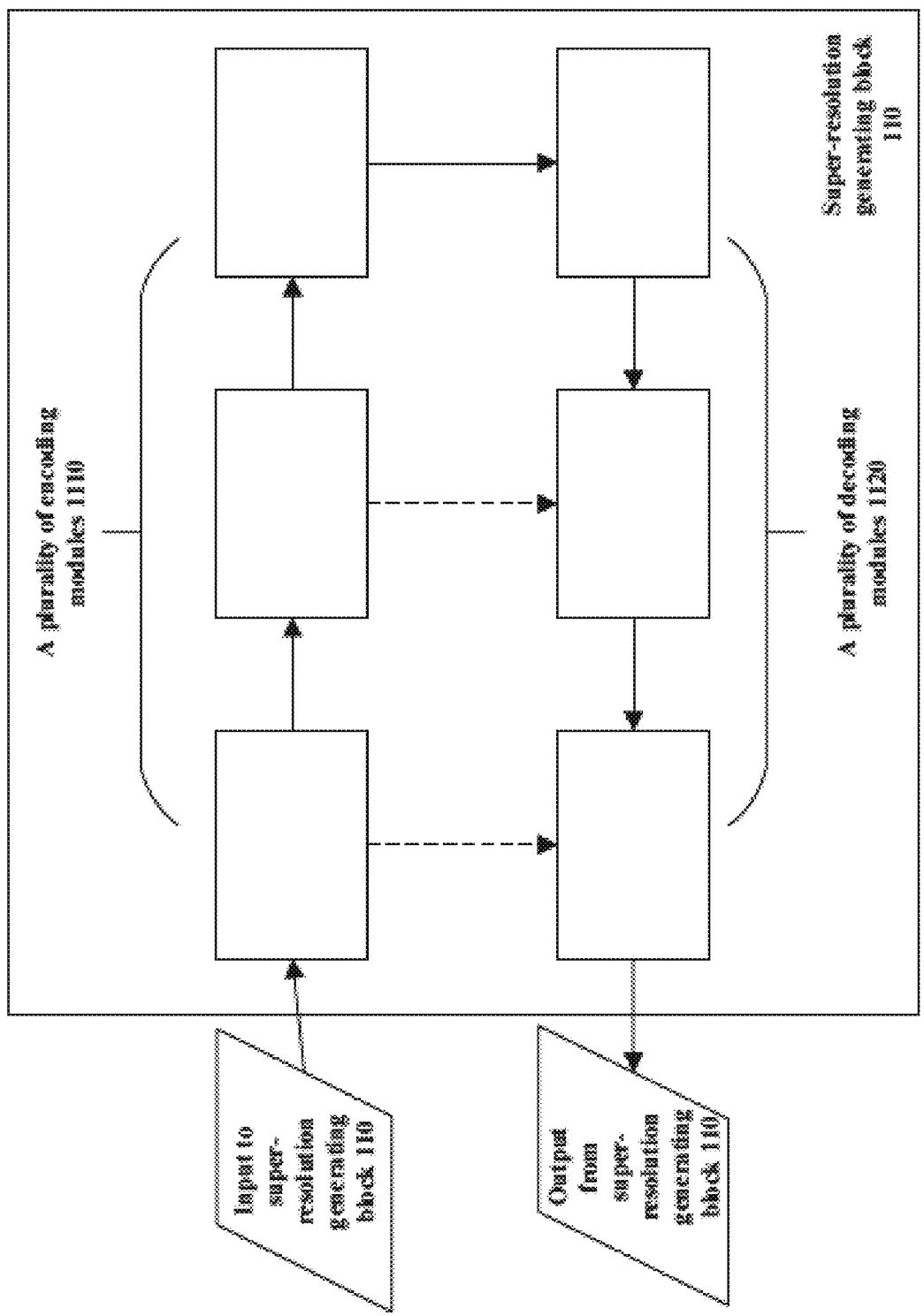
FIG. 5 is a schematic diagram illustrating the structure of a super-resolution generating block in some embodiments according to the present disclosure.

FIG. 5 is a schematic diagram illustrating the structure of a super-resolution generating block in some embodiments according to the present disclosure. Referring to FIG. 5, in some embodiments, the super-resolution generating block 110 includes a plurality of encoding modules 1110 and a plurality of decoding modules 1120 arranged in a U-Net architecture. U-Net is a fully convolutional network modified and extended to work with fewer training images and to yield more precise segmentations. The U-Net architecture includes a contracting path and an expansive path, which together give the network a u-shaped architecture (see, e.g., Olaf Ronneberger et al., "U-Net: Convolutional Networks for Biomedical Image Segmentation," Medical Image Computing and Computer-Assisted Intervention (MICCAI) 9351, pages 234-241 (2015); the entire contents of which is hereby incorporated by reference).

Figure 6:
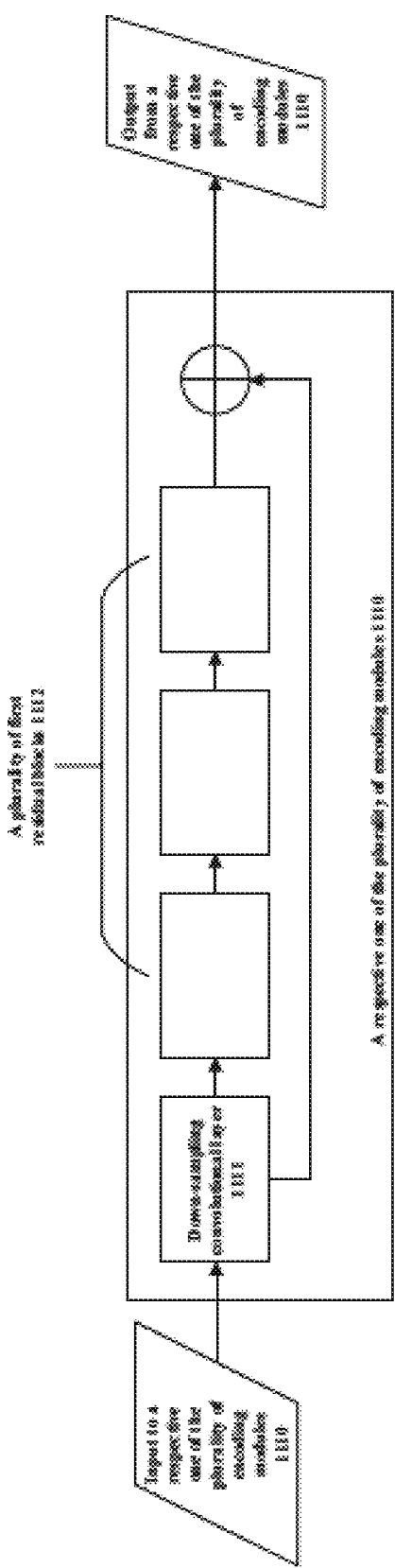
FIG. 6 is a schematic diagram illustrating the structure of a respective one of the plurality of encoding modules in some embodiments according to the present disclosure.

FIG. 6 is a schematic diagram illustrating the structure of a respective one of the plurality of encoding modules in some embodiments according to the present disclosure. Referring to FIG. 6, in some embodiments, a respective one of the plurality of encoding modules 1110 includes a down-sampling convolutional layer 1111, and a plurality of first residual blocks 1112 arranged in series. In one example, the down-sampling convolutional layer 1111 is a 2× down-sampling convolutional layer. Optionally, the down-sampling convolutional layer 1111 includes a convolutional layer (e.g., a 5*5 convolutional layer with a stride of 2) followed by a leaky rectified linear unit (LeakyReLU; see, e.g., Maas, et al., "Rectifier nonlinearities improve neural network acoustic models", In Proc. ICML, volume 30, 2013; and Xu, et al., "Empirical evaluation of rectified activations in convolutional network", arXiv preprint arXiv: 1505.00853, (2015); the entire contents of which is hereby incorporated by reference). Optionally, a respective one of the plurality of first residual blocks 1112 includes a convolutional layer (e.g., a 5*5 convolutional layer with a stride of 2), followed by a leaky rectified linear unit, then followed by another convolutional layer (e.g., a 5*5 convolutional layer with a stride of 2), and again followed by another leaky rectified linear unit.

As used herein, the term "convolution" refers to a process of processing an image. A convolutional kernel is used for a convolution. For example, each pixel of an input image has a value, a convolutional kernel starts at one pixel of the input image and moves over each pixel in an input image sequentially. At each position of the convolutional kernel, the convolutional kernel overlaps a few pixels on the image based on the size of the convolutional kernel. At a position of the convolutional kernel, a value of one of the few overlapped pixels is multiplied by a respective one value of the convolutional kernel to obtain a multiplied value of one of the few overlapped pixels. Subsequently, all multiplied values of the overlapped pixels are added to obtain a sum corresponding to the position of the convolutional kernel on the input image. By moving the convolutional kernel over each pixel of the input image, all the sums corresponding to all the position of the convolutional kernel are collected and output to form an output image. In one example, a convolution may extract different features of the input image using different convolutional kernels. In another example, a convolution process may add more features to the input image using different convolutional kernels.

As used herein, the term "convolutional layer" refers to a layer in a convolutional neural network. The convolutional layer is used to perform convolution on an input image to obtain an output image. Optionally, different convolutional kernels are used to performed different convolutions on the same input image. Optionally, different convolutional kernels are used to performed convolutions on different parts of the same input image. Optionally, different convolutional kernels are used to perform convolutions on different input images, for example, multiple images are inputted in a convolutional layer, a respective convolutional kernel is used to perform a convolution on an image of the multiple images. Optionally, different convolutional kernels are used according to different situations of the input image.

Figure 7:
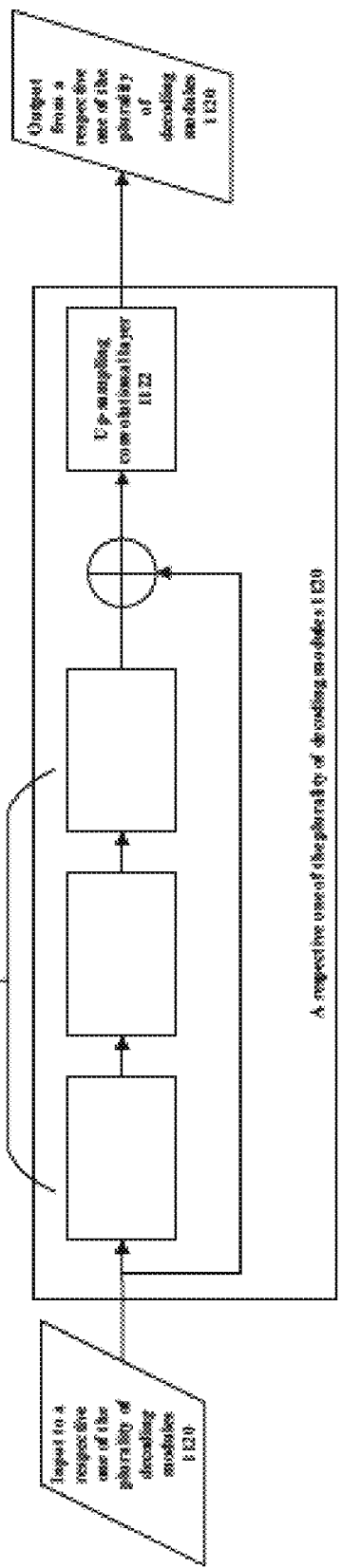
FIG. 7 is a schematic diagram illustrating the structure of a respective one of the plurality of decoding modules in some embodiments according to the present disclosure.

FIG. 7 is a schematic diagram illustrating the structure of a respective one of the plurality of decoding modules in some embodiments according to the present disclosure. Referring to FIG. 7, in some embodiments, a respective one of the plurality of decoding modules 1120 includes a plurality of second residual blocks 1121 arranged in series, and an up-sampling convolutional layer 1122. In one example, the up-sampling convolutional layer 1122 is a 2× down-sampling convolutional layer. Optionally, the up-sampling convolutional layer 1122 includes a de-convolutional layer (e.g., a 5*5 de-convolutional layer with a stride of 2) followed by a leaky rectified linear unit. Optionally, a respective one of the plurality of second residual blocks 1121 includes a convolutional layer (e.g., a 5*5 convolutional layer with a stride of 2), followed by a leaky rectified linear unit, then followed by another convolutional layer (e.g., a 5*5 convolutional layer with a stride of 2), and again followed by another leaky rectified linear unit.

As used herein, the term "down-sampling" refers to a process of extracting features of an input image, and outputting an output image with a smaller scale. As used herein, the term "up-sampling" refers to a process of adding more information to an input image, and outputting an outputting image with a larger scale. As used herein, the term "scale" refers to one or any combinations of three dimensions of an image, including one or any combinations of a width of the image, a height of the image, and a depth of the image. In one example, the scale of an image (e.g., a feature map, a data, a signal) refers to a "volume" of an image, which includes the width of the image, the height of the image, and the depth of the image. In another example, spatial scale of an image (e.g., a feature map, a data, a signal) refers to a width and length of the image, e.g., width×length. As used herein, the term "feature" generally refers to information about an image or a portion of an image, including any localized optical characteristic in an image, e.g. a spot, a line, or a pattern. In one exemplary instance, a feature takes the form of spatial information defined by a vector and/or integer.

Referring to FIG. 3, in some embodiments, the generator 10 further includes an additional super-resolution generating block 200. Optionally, the additional super-resolution generating block 200 is configured to receive an input from a last one of the plurality of super-resolution generating units 100 arranged in series. Accordingly, in some embodiments, the step of generating the high-resolution image further includes inputting an output from a last one of the plurality of super-resolution generating units 100 arranged in series into an additional super-resolution generating block 200; and processing the output from the last one of the plurality of super-resolution generating units 100 using the additional super-resolution generating block 200 to generate the high-resolution image.

Optionally, the additional super-resolution generating block 200 has an architecture similar or identical to a respective one of the plurality of super-resolution generating units 100 (e.g., those illustrated in FIGS. 5 to 7).

In some embodiments, the computer-implemented method further includes using a feedback loop to train the generator based on a generator loss function. As used herein, the term "loss function" refer to a functions that indicates loss errors. In one example, the generator loss function is defined as $$L_{total} = \sum_{i=0}^{m}(\alpha L_i^m + \beta L_i^\varphi);$$

wherein i stands for a respective number of a plurality of scales; $L^m$ is a mean square error function; $L^\varphi$ is a perceptual loss function; a stands for a weight coefficient for $L^m$; and β stands for a weight coefficients for $L^\varphi$. Optionally, a neural network model (such as a convolutional neural network) is used to process a reference image and the high-resolution image. Optionally, the $$L^m = \min \sum_{j=0}^{N} \frac{1}{N} \|I_j - \hat{I}_j\|_2^2;$$

$$\text{and } L_j^\varphi(\hat{I}, I) = \frac{1}{C_j H_j W_j} \|\varphi_j(\hat{I}) - \varphi_j(I)\|_2^2;$$

wherein I stands for the reference image; Î stands for the high-resolution image; φ stands for the neural network model; j stands for a respective one of a plurality of output layers of the neural network model; C stands for a number of channels of a feature map outputted from the respective one of a plurality of output layers; H stands for a height of the feature map outputted from the respective one of a plurality of output layers; and W stands for a width of the feature map outputted from the respective one of a plurality of output layers. Optionally, the neural network model is a VGG-19 model (e.g., a VGG-19 model originally developed by Visual Geometry Group of University of Oxford).

As used herein, the term "feature map" refers to a map or data representing a particular feature or parameter or characteristic of an image. The feature map may be graphically or mathematically represented. The feature map may be a form of simplified or alternative representation of an image. For example, the feature map is an outcome of applying a function to a topologically arranged vector of numbers to obtain a vector of corresponding output numbers preserving a topology. For example, a "feature map" is the result of using a layer of convolutional neural network to process an image or another feature map, for example, an image of scale (28, 28, 1) is inputted into the convolution layer, and the convolutional layer having 23 number of kernels with a kernel size of 1*1 generates a feature map of scale (26, 26, 32) by computing 32 kernels over the input image. A feature map has a width W, a height H, and a depth D, for example, the feature map of scale (26, 26, 32) has a width of 26, a height of 26, and a depth of 32. The feature map has 32 feature sub-maps, a total number of the feature sub-maps is equivalent to the depth of the feature map. The depth D is also represented by channels of the feature map, so the feature map of scale (26, 26, 32) includes 32 channels and each channels has a 26×26 grid of values.

As used herein, the term "neural network" refers to a network used for solving artificial intelligence (AI) problems. A neural network includes a plurality of hidden layers. A respective one of the plurality of hidden layers includes a plurality of neurons (e.g. nodes). A plurality of neurons in a respective one of the plurality of hidden layers are connected with a plurality of neurons in an adjacent one of the plurality of hidden layers. Connects between neurons have different weights. The neural network has a structure that mimics a structure of a biological neural network. The neural network can solve problems using a non-deterministic manner. Parameters of the neural network can be tuned by pre-training, for example, a large amount of problems are input in the neural network, and results are obtained from the neural network. Feedbacks on these results is fed back into the neural network to allow the neural network to tune the parameters of the neural network. The pre-training allows the neural network to have a stronger problem-solving ability.

As used herein, the term "convolutional neural network" refers to a deep feed-forward artificial neural network. Optionally, a convolutional neural network includes a plurality of convolutional layers, a plurality of up-sampling layers, and a plurality of down-sampling layers. For example, a respective one of the plurality of convolutional layers can process an image. An up-sampling layer and a down-sampling layer can change a scale of an input image to one corresponding to a certain convolutional layer. The output from the up-sampling layer or the down-sampling layer can then be processed by a convolutional layer of a corresponding scale. This enables the convolutional layer to add or extract a feature having a scale different from that of the input image. By pre-training, parameters include, but are not limited to, a convolutional kernel, a bias, and a weight of a convolutional layer of a convolutional neural network can be tuned. Accordingly, the convolutional neural network can be used in various applications such as image recognition, image feature extraction, and image feature addition.

Figure 8A:
FIG. 8A shows a low-resolution image in some embodiments according to the present disclosure.
Figure 8B:
FIG. 8B shows a high-resolution image generated by a computer-implemented method in some embodiments according to the present disclosure.

In one example, the computer-implemented method is used for de-blurring a low-resolution image. FIG. 8A shows a low-resolution image in some embodiments according to the present disclosure. FIG. 8B shows a high-resolution image generated by a computer-implemented method in some embodiments according to the present disclosure. As shown in FIG. 8B, the present method can de-blur a low resolution image to a high-resolution image with a relatively high degree of detail restoration.

In some embodiments, the computer-implemented method further includes pre-training a convolutional neural network by inputting a plurality of training low-resolution images into the convolutional neural network; inputting a plurality of training reference images into the convolutional neural network; generating a plurality of training high-resolution images using the generator respectively based on the plurality of training low-resolution images; computing loss for the plurality of training high-resolution images respectively based on the generator loss function; and tuning the convolutional neural network based on the loss. In one example, the present training method uses a database having a large number of high-resolution images (e.g., 4000 frames of natural scene images). The training learning rate may be set to 1 e$^{-4}$, with a number of iterations set to 4000. In another example, the convolutional neural network has converged after about 80 iterations.

Figure 9:
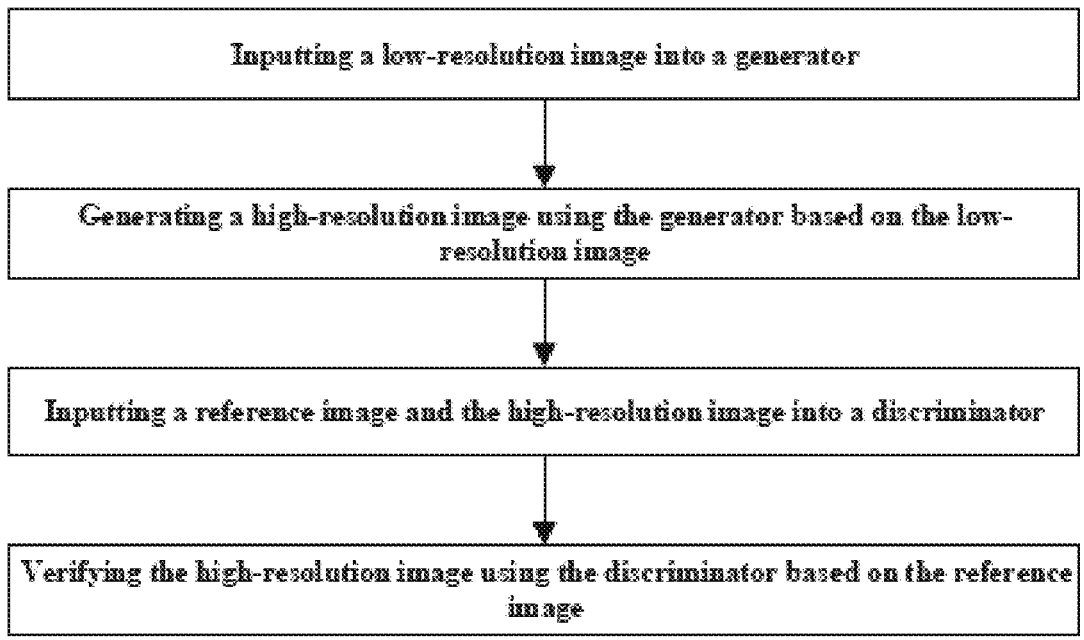
FIG. 9 is a flow chart illustrating a computer-implemented method in some embodiments according to the present disclosure.

FIG. 9 is a flow chart illustrating a computer-implemented method in some embodiments according to the present disclosure. Referring to FIG. 9, in some embodiments, the computer-implemented method includes inputting a low-resolution image into a generator; generating a high-resolution image using the generator based on the low-resolution image; inputting a reference image and the high-resolution image into a discriminator; and verifying the high-resolution image using the discriminator based on the reference image. Optionally, the generator and the discriminator are components of a generative adversarial network (GAN). As used herein, the term "generative adversarial network" refers to a neural network that includes a generator and a discriminator. In one example, the discriminator may be initially trained to distinguish between actual data and fake data that could be drawn from another random distribution. Optionally, the initial training of the discriminator is not mandatory, and the discriminator could be trained in step with the generator. Often for reasons of efficiency and stability of training, a trained discriminator is used initially and training is continued with the generator. The generator may be initialized with a random distribution of data samples (for example, a normal distribution). During training of the generator, a fake sample (or a batch of fake samples) is randomly drawn from the generator distribution and is passed to the discriminator. An actual data sample (or a batch of actual data samples) are also passed to the discriminator. The discriminator in turns tries to discriminate between these samples as true or fake. A 'true sample' is one drawn from the actual data and a 'fake sample' is one generated by the generator. Depending on the output of discriminator, a loss function is minimized at the generator. As such, the parameters (e.g. model weights) of the generator are adjusted, which in turn allows the generator to better discriminate between true and fake samples.

In some embodiments, the step of generating the high-resolution image includes processing the low-resolution image through a plurality of super-resolution generating units arranged in series in the generator, wherein a respective output from a respective one of the plurality of super-resolution generating units has a respective increased image resolution as compared to a respective input to the respective one of the plurality of super-resolution generating units; and the step of verifying the high-resolution image includes processing the high-resolution image through a plurality of convolutional layers arranged in series, and a fully connection layer.

Figure 10:
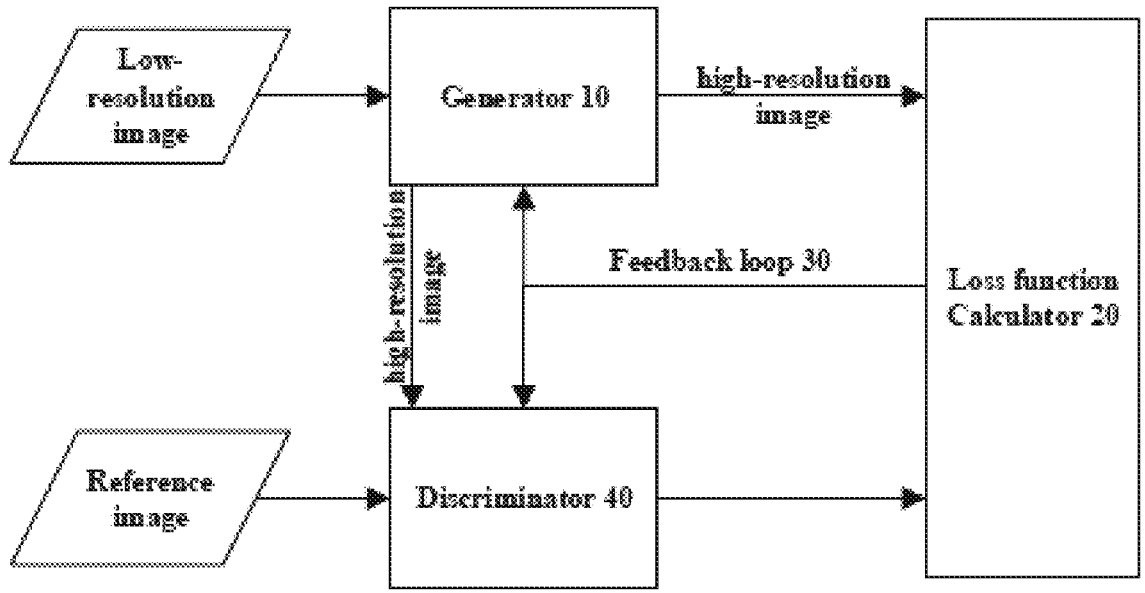
FIG. 10 is a schematic diagram illustrating the structure of an apparatus for implementing a computer-implemented method in some embodiments according to the present disclosure.

FIG. 10 is a schematic diagram illustrating the structure of an apparatus for implementing a computer-implemented method in some embodiments according to the present disclosure. Referring to FIG. 10, the apparatus for implementing a computer-implemented method in some embodiments includes a generator 10, a loss function calculator 20, a discriminator 40, and a feedback loop 30. The generator 10 is configured to receive a low-resolution image as an input, and output a high-resolution image to the loss function calculator 20. In some embodiments, the generator 10 further outputs the high-resolution image to the discriminator 40. The discriminator 40 is configured to receive a reference image (e.g., a high-resolution actual image, e.g., "true sample"), and determine whether the high-resolution image is real or fake. The loss function calculator 20 in some embodiments computes a generator loss function and a discriminator loss function based on the high-resolution image and the reference image. The feedback loop 30 is configured to mutually train the generator 10 and the discriminator 40 of the GAN, based on a generator loss function and a discriminator loss function. In one example, the structure of the generator 10 is that described above, e.g., in connection with FIGS. 3 to 7 and associated descriptions.

Figure 11:
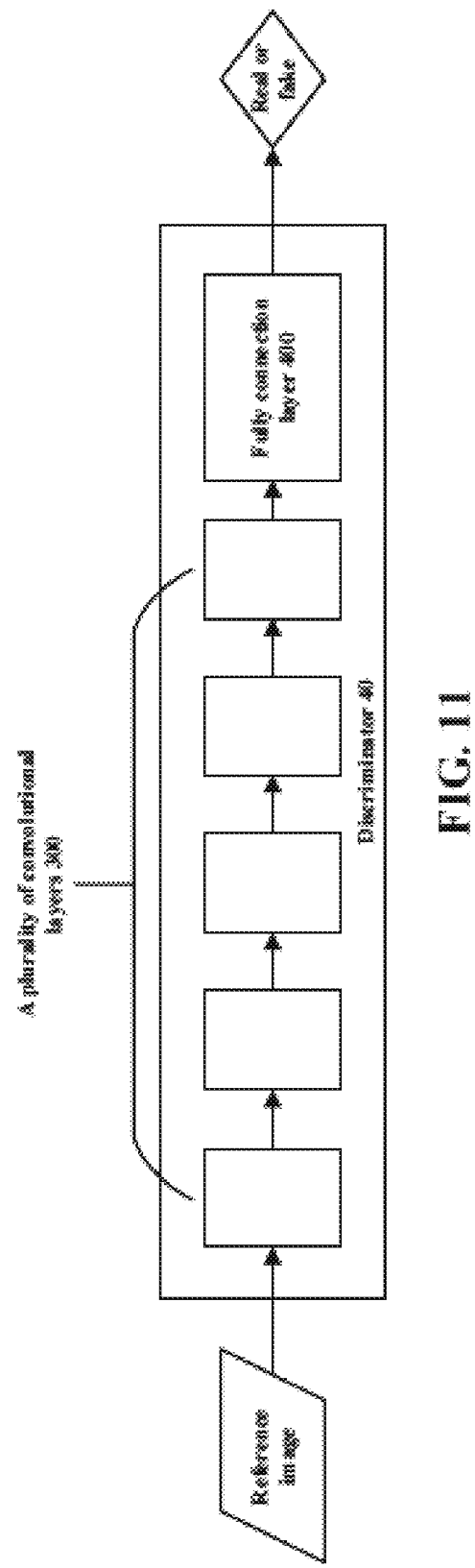
FIG. 11 is a schematic diagram illustrating the structure of a discriminator in some embodiments according to the present disclosure.

FIG. 11 is a schematic diagram illustrating the structure of a discriminator in some embodiments according to the present disclosure. Referring to FIG. 11, in some embodiments, the discriminator 40 includes a plurality of convolutional layers 300 arranged in series, and a fully connection layer 400. Optionally, the fully connection layer 400 is configured to receive an input from a last one of the plurality of convolutional layers 300 arranged in series. In one example, a total number of the plurality of convolutional layers 300 is five. In another example, each of the plurality of convolutional layers 300 is a 5*5 convolutional layer with a stride of 2, followed by a rectified linear unit (ReLU; see, e.g., Nair, Hinton, "Rectified Linear Units Improve Restricted Boltzmann Machines", Proceedings of the 27th International Conference on Machine Learning, Haifa, Israel, (2010); the entire contents of which is hereby incorporated by reference). In another example, kernel sizes of the plurality of convolutional layers 300 are 32, 64, 128, 96, and 96, respectively. In another example, the fully connection layer 400 a 96*16*16 convolutional layer.

In some embodiments, the generator loss function is defined as $$\min V(D, G) = \sum_{i=0}^{3} \alpha_i E_{x \sim P_z(z)}[\log(1 - D_i(G_i(z)))] + \beta_i L_i^p;$$

and the discriminator loss function is defined as $$\max V(D, G) = \sum_{i=0}^{3} \alpha_i E_{x \sim P_{data}(x)}[\log(D_i(x))] + E_{x \sim P_z(z)}[\log(1 - D_i(G_i(z)))];$$

wherein D stands for the discriminator; G stands for the generator; i stands for a respective number of a plurality of scales; $\alpha_i$ and $\beta_i$ stand for weight coefficients corresponding to the respective number of a plurality of scales; E stands for a probability density distribution; $L_i^p$ is a perceptual loss function; $P_{data}(x)$ stands for a probability distribution of the reference image; x stands for a sample from $P_{data}(x)$; $P_z(z)$ stands for a probability distribution of the high-resolution image; and z stands for a sample from $P_z(z)$.

In some embodiments, a neural network model is used to process a reference image and the high-resolution image. Optionally, the perceptual loss function is calculated as follows:

$$L_j^{\varphi}(\hat{I}, I) = \frac{1}{C_j H_j W_j} \|\varphi_j(\hat{I}) - \varphi_j(I)\|_2^2;$$

wherein I stands for the reference image; Î stands for the high-resolution image; φ stands for the neural network model; j stands for a respective one of a plurality of output layers of the neural network model; C stands for a number of channels of a feature map outputted from the respective one of a plurality of output layers; H stands for a height of the feature map outputted from the respective one of a plurality of output layers; and W stands for a width of the feature map outputted from the respective one of a plurality of output layers. Optionally, the neural network model is a VGG-19 model. Optionally, the neural network model is a sphereNet model (see, e.g., Coors et al., "SphereNet: Learning Spherical Representations for Detection and Classification in Omnidirectional Images," European Conference on Computer Vision 2018: Computer Vision—ECCV 2018 pp 525-541; the entire contents of which is hereby incorporated by reference).

Figure 12C:
FIG. 12C shows a reference image in some embodiments according to the present disclosure.
Figure 12B:
FIG. 12B shows a high-resolution image generated by a computer-implemented method in some embodiments according to the present disclosure.
Figure 12A:
FIG. 12A shows a low-resolution image in some embodiments according to the present disclosure.

In one example, the computer-implemented method is used for face hallucination of a facial image of a subject. FIG. 12A shows a low-resolution image in some embodiments according to the present disclosure. FIG. 12B shows a high-resolution image generated by a computer-implemented method in some embodiments according to the present disclosure. FIG. 12C shows a reference image in some embodiments according to the present disclosure. As shown in FIG. 12B, the present method can enhance the facial image to a high resolution with details of the face (e.g., hair, eyebrows, glasses, wrinkles, and so on) restored.

Figure 13C:
FIG. 13C shows a reference image in some embodiments according to the present disclosure.
Figure 13B:
FIG. 13B shows a high-resolution image generated by a computer-implemented method in some embodiments according to the present disclosure.
Figure 13A:
FIG. 13A shows a low-resolution image in some embodiments according to the present disclosure.

In one example, the computer-implemented method is used for de-blurring a low-resolution image. FIG. 13A shows a low-resolution image in some embodiments according to the present disclosure. FIG. 13B shows a high-resolution image generated by a computer-implemented method in some embodiments according to the present disclosure. FIG. 13C shows a reference image in some embodiments according to the present disclosure. As shown in FIG. 13B, the present method can de-blur a low resolution image to a high-resolution image with a relatively high degree of detail restoration.

In some embodiments, the computer-implemented method further includes pre-training a convolutional neural network by inputting a plurality of training low-resolution images into the convolutional neural network; inputting a plurality of training reference images into the convolutional neural network; generating a plurality of training high-resolution images using the generator respectively based on the plurality of training low-resolution images; computing generator loss for the plurality of training high-resolution images respectively based on the generator loss function; computing discriminator loss for the plurality of training high-resolution images respectively based on the discriminator loss function; and tuning the convolutional neural network based on the generator loss and the discriminator loss. In one example, the present training method uses a database having a large number of high-resolution images (e.g., 4000 frames of natural scene images, or a celebA-HQ facial image database with 200K frames of facial images). The training learning rate may be set to 1 $e^{-4}$, with a number of iterations set to 100.

Figure 14:
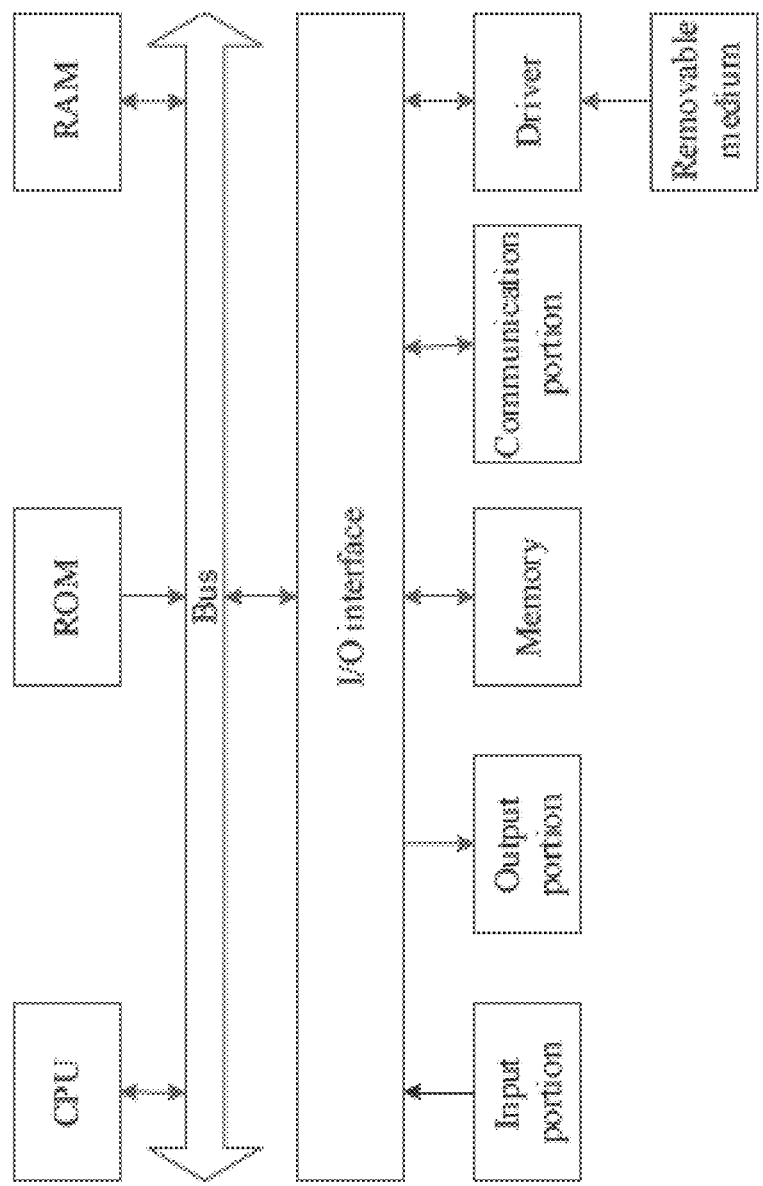
FIG. 14 is a schematic diagram of a structure of an apparatus in some embodiments according to the present disclosure.

In another aspect, the present disclosure provides an apparatus. FIG. 14 is a schematic diagram of a structure of an apparatus in some embodiments according to the present disclosure. Referring to FIG. 14, in some embodiments, the apparatus includes the central processing unit (CPU) configured to perform actions according to the computer-executable instructions stored in a ROM or in a RAM. Optionally, data and programs required for a computer system are stored in RAM. Optionally, the CPU, the ROM, and the RAM are electrically connected to each other via bus. Optionally, an input/output interface is electrically connected to the bus.

In some embodiments, the apparatus includes a memory, and one or more processors, wherein the memory and the one or more processors are connected with each other. In some embodiments, the memory stores computer-executable instructions for controlling the one or more processors to input a low-resolution image into a generator; and generate a high-resolution image using the generator based on the low-resolution image by processing the low-resolution image through a plurality of super-resolution generating units arranged in series in the generator. Optionally, a respective output from a respective one of the plurality of super-resolution generating units has a respective increased image resolution as compared to a respective input to the respective one of the plurality of super-resolution generating units.

In some embodiments, the respective one of the plurality of super-resolution generating units includes a super-resolution generating block, a bilinear interpolation block, and a concatenation block. Optionally, the memory further stores computer-executable instructions for controlling the one or more processors to input a respective input to the super-resolution generating block and the bilinear interpolation block, respectively; process the respective input using the super-resolution generating block to generate a first intermediate output from the super-resolution generating block; input the first intermediate output from the super-resolution generating block to the bilinear interpolation block; generate a second intermediate output using the bilinear interpolation block based on the respective input and the first intermediate output; input the second intermediate output to the concatenation block; and generate the respective output from the concatenation block based on the second intermediate output.

In some embodiments, the super-resolution generating block includes a plurality of encoding modules and a plurality of decoding modules arranged in a u-net architecture. Optionally, a respective one of the plurality of encoding modules includes a down-sampling convolutional layer, and a plurality of first residual blocks arranged in series. Optionally, a respective one of the plurality of decoding modules includes a plurality of second residual blocks arranged in series, and an up-sampling convolutional layer.

In some embodiments, the memory further stores computer-executable instructions for controlling the one or more processors to input an output from a last one of the plurality of super-resolution generating units arranged in series into an additional super-resolution generating block; and process the output from the last one of the plurality of super-resolution generating units using the additional super-resolution generating block to generate the high-resolution image.

In some embodiments, the memory further stores computer-executable instructions for controlling the one or more processors to use a feedback loop to train the generator based on a generator loss function. Optionally, the generator loss function is defined as $$L_{total} = \sum_{i=0}^{n} (\alpha L_i^m + \beta L_i^\varphi);$$

wherein i stands for a respective number of a plurality of scales; $L^m$ is a mean square error function; $L^\varphi$ is a perceptual loss function; $\alpha$ stands for a weight coefficient for $L^m$; and $\beta$ stands for a weight coefficients for $L^\varphi$.

In some embodiments, a neural network model is used to process a reference image and the high-resolution image. Optionally, $$L^m = \min \sum_{j=0}^N \frac{1}{N} \|I_j - \hat{I}_j\|_2^2;$$

$$\text{and } L_j^\varphi(\hat{I}, I) = \frac{1}{C_j H_j W_j} \|\varphi_j(\hat{I}) - \varphi_j(I)\|_2^2;$$

wherein I stands for the reference image; $\hat{I}$ stands for the high-resolution image; φ stands for the neural network model; j stands for a respective one of a plurality of output layers of the neural network model; C stands for a number of channels of a feature map outputted from the respective one of a plurality of output layers; H stands for a height of the feature map outputted from the respective one of a plurality of output layers; and W stands for a width of the feature map outputted from the respective one of a plurality of output layers. Optionally, the neural network model is a VGG-19 model.

In some embodiments, the memory further stores computer-executable instructions for controlling the one or more processors to pre-train a convolutional neural network by inputting a plurality of training low-resolution images into the convolutional neural network; inputting a plurality of training reference images into the convolutional neural network; generating a plurality of training high-resolution images using the generator respectively based on the plurality of training low-resolution images; computing loss for the plurality of training high-resolution images respectively based on the generator loss function; and tuning the convolutional neural network based on the loss.

In some embodiments, the memory further stores computer-executable instructions for controlling the one or more processors to input a reference image and the high-resolution image into a discriminator; and verify the high-resolution image using the discriminator based on the reference image. Optionally, the generator and the discriminator are components of a generative adversarial network (GAN).

In some embodiments, the memory further stores computer-executable instructions for controlling the one or more processors to process the high-resolution image through a plurality of convolutional layers arranged in series, and a fully connection layer.

In some embodiments, the memory further stores computer-executable instructions for controlling the one or more processors to use a feedback loop to mutually train the generator and the discriminator of the GAN, based on a generator loss function and a discriminator loss function. Optionally, the generator loss function is defined as $$\min V(D, G) = \sum_{i=0}^3 \alpha_i E_{x \sim P_z(z)}[\log(1 - D_i(G_i(z)))] + \beta_i L_i^p;$$

and the discriminator loss function is defined as $$\max V(D, G) =$$
$$\sum_{i=0}^3 \alpha_i E_{x \sim P_{data}(x)}[\log(D_i(x))] + E_{x \sim P_z(z)}[\log(1 - D_i(G_i(z)))];$$

wherein D stands for the discriminator; G stands for the generator; i stands for a respective number of a plurality of scales; $\alpha_i$ and $\beta_i$ stand for weight coefficients corresponding to the respective number of a plurality of scales; E stands for a probability density distribution; $L_i^p$ is a perceptual loss function; $P_{data}(x)$ stands for a probability distribution of the reference image; x stands for a sample from $P_{data}(x)$; $P_z(z)$ stands for a probability distribution of the high-resolution image; and z stands for a sample from $P_z(z)$.

In some embodiments, a neural network model is used to process a reference image and the high-resolution image. Optionally, the perceptual loss function is calculated as follows $$L_j^\varphi(\hat{I}, I) = \frac{1}{C_j H_j W_j} \|\varphi_j(\hat{I}) - \varphi_j(I)\|_2^2;$$

wherein I stands for the reference image; $\hat{I}$ stands for the high-resolution image; φ stands for the neural network model; j stands for a respective one of a plurality of output layers of the neural network model; C stands for a number of channels of a feature map outputted from the respective one of a plurality of output layers; H stands for a height of the feature map outputted from the respective one of a plurality of output layers; and W stands for a width of the feature map outputted from the respective one of a plurality of output layers. Optionally, the neural network model is a VGG-19 model. Optionally, the neural network model is a sphereNet model.

In some embodiments, the memory further stores computer-executable instructions for controlling the one or more processors to pre-train a convolutional neural network by inputting a plurality of training low-resolution images into the convolutional neural network; inputting a plurality of training reference images into the convolutional neural network; generating a plurality of training high-resolution images using the generator respectively based on the plurality of training low-resolution images; computing generator loss for the plurality of training high-resolution images respectively based on the generator loss function; computing discriminator loss for the plurality of training high-resolution images respectively based on the discriminator loss function; and tuning the convolutional neural network based on the generator loss and the discriminator loss.

In another aspect, the present disclosure provides a computer-program product including a non-transitory tangible computer-readable medium having computer-readable instructions thereon. In some embodiments, the computer-readable instructions being executable by a processor to cause the processor to perform inputting a low-resolution image into a generator; and generating a high-resolution image using the generator based on the low-resolution image. Optionally, generating the high-resolution image includes processing the low-resolution image through a plurality of super-resolution generating units arranged in series in the generator, wherein a respective output from a respective one of the plurality of super-resolution generating units has a respective increased image resolution as compared to a respective input to the respective one of the plurality of super-resolution generating units.

In some embodiments, the respective one of the plurality of super-resolution generating units includes a super-resolution generating block, a bilinear interpolation block, and a concatenation block. Optionally, generating the high-resolution image using the generator further includes inputting a respective input to the super-resolution generating block and the bilinear interpolation block, respectively; processing the respective input using the super-resolution generating block to generate a first intermediate output from the super-resolution generating block; inputting the first intermediate output from the super-resolution generating block to the bilinear interpolation block; generating a second intermediate output using the bilinear interpolation block based on the respective input and the first intermediate output; inputting the second intermediate output to the concatenation block; and generating the respective output from the concatenation block based on the second intermediate output.

In some embodiments, the super-resolution generating block includes a plurality of encoding modules and a plurality of decoding modules arranged in a U-Net architecture. Optionally, a respective one of the plurality of encoding modules includes a down-sampling convolutional layer, and a plurality of first residual blocks arranged in series; and a respective one of the plurality of decoding modules includes a plurality of second residual blocks arranged in series, and an up-sampling convolutional layer.

In some embodiments, generating the high-resolution image using the generator further includes inputting an output from a last one of the plurality of super-resolution generating units arranged in series into an additional super-resolution generating block; and processing the output from the last one of the plurality of super-resolution generating units using the additional super-resolution generating block to generate the high-resolution image.

In some embodiments, the computer-readable instructions are executable by a processor to cause the processor to further perform using a feedback loop to train the generator based on a generator loss function. Optionally, the generator loss function is defined as $$L_{total} = \sum_{k=0}^{m}(\alpha L_i^m + \beta L_i^\varphi);$$

wherein i stands for a respective number of a plurality of scales; $L^m$ is a mean square error function; $L^\varphi$ is a perceptual loss function; $\alpha$ stands for a weight coefficient for $L^m$; and $\beta$ stands for a weight coefficients for $L^\varphi$.

In some embodiments, a neural network model is used to process a reference image and the high-resolution image. Optionally, $$L^m = \min\sum_{j=0}^{N}\frac{1}{N}\|I_j - \hat{I}_j\|_2^2;$$

$$\text{and } L_j^\varphi(\hat{I}, I) = \frac{1}{C_j H_j W_j}\|\varphi_j(\hat{I}) - \varphi_j(I)\|_2^2;$$

wherein I stands for the reference image; Î stands for the high-resolution image; φ stands for the neural network model; j stands for a respective one of a plurality of output layers of the neural network model; C stands for a number of channels of a feature map outputted from the respective one of a plurality of output layers; H stands for a height of the feature map outputted from the respective one of a plurality of output layers; and W stands for a width of the feature map outputted from the respective one of a plurality of output layers. Optionally, the neural network model is a VGG-19 model.

In some embodiments, the computer-readable instructions are executable by a processor to cause the processor to further perform pre-training a convolutional neural network by inputting a plurality of training low-resolution images into the convolutional neural network; inputting a plurality of training reference images into the convolutional neural network; generating a plurality of training high-resolution images using the generator respectively based on the plurality of training low-resolution images; computing loss for the plurality of training high-resolution images respectively based on the generator loss function; and tuning the convolutional neural network based on the loss.

In some embodiments, the computer-readable instructions are executable by a processor to cause the processor to further perform inputting a reference image and the high-resolution image into a discriminator; and verifying the high-resolution image using the discriminator based on the reference image. Optionally, the generator and the discriminator are components of a generative adversarial network (GAN).

In some embodiments, verifying the high-resolution image includes processing the high-resolution image through a plurality of convolutional layers arranged in series, and a fully connection layer.

In some embodiments, the computer-readable instructions are executable by a processor to cause the processor to further perform using a feedback loop to mutually train the generator and the discriminator of the GAN, based on a generator loss function and a discriminator loss function. Optionally, the generator loss function is defined as $$\min V(D, G) = \sum_{k=0}^{3} a_i E_{x \sim P_z(z)}[\log(1 - D_i(G_i(z)))] + \beta_i L_i^p;$$

and the discriminator loss function is defined as $$\max V(D, G) = \sum_{k=0}^{3} \alpha_i E_{x \sim P_{data}(x)}[\log(D_i(x))] + E_{x \sim P_z(z)}[\log(1 - D_i(G_i(z)))];$$

wherein D stands for the discriminator; G stands for the generator; i stands for a respective number of a plurality of scales; $\alpha_i$ and $\beta_i$ stand for weight coefficients corresponding to the respective number of a plurality of scales; E stands for a probability density distribution; $L_i^p$ is a perceptual loss function; $P_{data}(x)$ stands for a probability distribution of the reference image; x stands for a sample from $P_{data}(x)$; $P_z(z)$ stands for a probability distribution of the high-resolution image; and z stands for a sample from $P_z(z)$.

In some embodiments, a neural network model is used to process a reference image and the high-resolution image. Optionally, the perceptual loss function is calculated as follows $$L_j^\varphi(\hat{I}, I) = \frac{1}{C_j H_j W_j}\|\varphi_j(\hat{I}) - \varphi_j(I)\|_2^2;$$

wherein I stands for the reference image; Î stands for the high-resolution image; φ stands for the neural network model; j stands for a respective one of a plurality of output layers of the neural network model; C stands for a number of channels of a feature map outputted from the respective one of a plurality of output layers; H stands for a height of the feature map outputted from the respective one of a plurality of output layers; and W stands for a width of the feature map outputted from the respective one of a plurality of output layers. Optionally, the neural network model is a VGG-19 model. Optionally, the neural network model is a sphereNet model.

In some embodiments, the computer-readable instructions are executable by a processor to cause the processor to further perform pre-training a convolutional neural network by inputting a plurality of training low-resolution images into the convolutional neural network; inputting a plurality of training reference images into the convolutional neural network; generating a plurality of training high-resolution images using the generator respectively based on the plurality of training low-resolution images; computing generator loss for the plurality of training high-resolution images respectively based on the generator loss function; computing discriminator loss for the plurality of training high-resolution images respectively based on the discriminator loss function; and tuning the convolutional neural network based on the generator loss and the discriminator loss.

Various illustrative neural networks, units, modules, and other operations described in connection with the configurations disclosed herein may be implemented as electronic hardware, computer software, or combinations of both. Such neural networks, units, modules, and other operations may be implemented or performed with a general purpose processor, a digital signal processor (DSP), an ASIC or ASSP, an FPGA or other programmable logic device, discrete gate or transistor logic, discrete hardware components, or any combination thereof designed to produce the configuration as disclosed herein. For example, such a configuration may be implemented at least in part as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a general purpose processor or other digital signal processing unit. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. A software module may reside in a non-transitory storage medium such as RAM (random-access memory), ROM (read-only memory), non-volatile RAM (NVRAM) such as flash RAM, erasable programmable ROM (EPROM), electrically erasable programmable ROM (EEPROM), registers, hard disk, a removable disk, or a CD-ROM; or in any other form of storage medium known in the art. An illustrative storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The foregoing description of the embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A computer-implemented method, comprising:
   inputting a low-resolution image into a generator; and
   generating a high-resolution image using the generator based on the low-resolution image;
   wherein generating the high-resolution image comprises processing the low-resolution image through a plurality of super-resolution generating units arranged in series in the generator, wherein a respective output from a respective one of the plurality of super-resolution generating units has a respective increased image resolution as compared to a respective input to the respective one of the plurality of super-resolution generating units;
   wherein the respective one of the plurality of super-resolution generating units comprises a super-resolution generating block and a bilinear interpolation block;
   wherein generating the high-resolution image using the generator further comprises:
   inputting a respective input to the super-resolution generating block and the bilinear interpolation block, respectively;
   processing the respective input using the super-resolution generating block to generate a first intermediate output from the super-resolution generating block;
   inputting the first intermediate output from the super-resolution generating block to the bilinear interpolation block; and
   generating a second intermediate output using the bilinear interpolation block based on the respective input and the first intermediate output;
   wherein the super-resolution generating block comprises a plurality of encoding modules and a plurality of decoding modules arranged in a u-net architecture;
   a respective one of the plurality of encoding modules comprises a down-sampling convolutional layer, and a plurality of first residual blocks arranged in series; and
   a respective one of the plurality of decoding modules comprises a plurality of second residual blocks arranged in series, and an up-sampling convolutional layer.

2. The computer-implemented method of claim 1, wherein the respective one of the plurality of super-resolution generating units further comprises a concatenation block;
   wherein generating the high-resolution image using the generator further comprises:
   inputting the second intermediate output to the concatenation block; and
   generating the respective output from the concatenation block based on the second intermediate output.

3. The computer-implemented method of claim 1, wherein generating the high-resolution image using the generator further comprises:
   inputting an output from a last one of the plurality of super-resolution generating units arranged in series into an additional super-resolution generating block; and
   processing the output from the last one of the plurality of super-resolution generating units using the additional super-resolution generating block to generate the high-resolution image.

4. The computer-implemented method of claim 1, the computer-implemented method further comprising using a feedback loop to train the generator based on a generator loss function.

5. The computer-implemented method of claim 4, wherein the generator loss function is defined as:

$$L_{total} = \sum_{i=0}^{n}(\alpha L_i^m + \beta L_i^\varphi);$$

wherein i stands for a respective number of a plurality of scales; $L^m$ is a mean square error function; $L^\varphi$ is a perceptual loss function; $\alpha$ stands for a weight coefficient for $L^m$; and $\beta$ stands for a weight coefficients for $L^\varphi$.

6. The computer-implemented method of claim 5, wherein a neural network model is used to process a reference image and the high-resolution image;

$$L^m = \min \sum_{j=0}^{N} \frac{1}{N} \|I_j - \hat{I}_j\|_2^2;$$

$$\text{and } L_j^\varphi(\hat{I}, I) = \frac{1}{C_j H_j W_j} \|\varphi_j(\hat{I}) - \varphi_j(I)\|_2^2;$$

wherein I stands for the reference image; $\hat{I}$ stands for the high-resolution image; $\varphi$ stands for the neural network model; j stands for a respective one of a plurality of output layers of the neural network model; C stands for a number of channels of a feature map outputted from the respective one of a plurality of output layers; H stands for a height of the feature map outputted from the respective one of a plurality of output layers; and W stands for a width of the feature map outputted from the respective one of a plurality of output layers.

7. The computer-implemented method of claim 6, wherein the neural network model is a VGG-19 model.

8. The computer-implemented method of claim 4, further comprising pre-training a convolutional neural network by:
   inputting a plurality of training low-resolution images into the convolutional neural network;
   inputting a plurality of training reference images into the convolutional neural network;
   generating a plurality of training high-resolution images using the generator respectively based on the plurality of training low-resolution images;
   computing loss for the plurality of training high-resolution images respectively based on the generator loss function; and
   tuning the convolutional neural network based on the loss.

9. The computer-implemented method of claim 1, the computer-implemented method further comprising:
   inputting a reference image and the high-resolution image into a discriminator; and
   verifying the high-resolution image using the discriminator based on the reference image;
   wherein the generator and the discriminator are components of a generative adversarial network (GAN).

10. The computer-implemented method of claim 9, wherein verifying the high-resolution image comprises processing the high-resolution image through a plurality of convolutional layers arranged in series, and a fully connection layer.

11. The computer-implemented method of claim 9, the computer-implemented method further comprising using a feedback loop to mutually train the generator and the discriminator of the GAN, based on a generator loss function and a discriminator loss function.

12. The computer-implemented method of claim 11, wherein the generator loss function is defined as:

$$\min V(D, G) = \sum_{i=0}^{3} \alpha_i E_{x \sim P_z(z)}[\log(1 - D_i(G_i(z)))] + \beta_i L_i^p; \text{ and}$$

the discriminator loss function is defined as:

$$\max V(D, G) = \sum_{i=0}^{3} \alpha_i E_{x \sim P_{data}(x)}[\log(D_i(x))] + E_{x \sim P_z(z)}[\log(1 - D_i(G_i(z)))];$$

wherein D stands for the discriminator; G stands for the generator; i stands for a respective number of a plurality of scales; $\alpha_i$ and $\beta_i$ stand for weight coefficients corresponding to the respective number of a plurality of scales; E stands for a probability density distribution; $L_i^p$ is a perceptual loss function; $P_{data}(x)$ stands for a probability distribution of the reference image; x stands for a sample from $P_{data}(x)$; $P_z(z)$ stands for a probability distribution of the high-resolution image; and z stands for a sample from $P_z(z)$.

13. The computer-implemented method of claim 12, wherein a neural network model is used to process a reference image and the high-resolution image;
the perceptual loss function is calculated as follows:

$$L_j^\varphi(\hat{I}, I) = \frac{1}{C_j H_j W_j} \|\varphi_j(\hat{I}) - \varphi_j(I)\|_2^2;$$

wherein I stands for the reference image; $\hat{I}$ stands for the high-resolution image; $\varphi$ stands for the neural network model; j stands for a respective one of a plurality of output layers of the neural network model; C stands for a number of channels of a feature map outputted from the respective one of a plurality of output layers; H stands for a height of the feature map outputted from the respective one of a plurality of output layers; and W stands for a width of the feature map outputted from the respective one of a plurality of output layers.

14. The computer-implemented method of claim 13, wherein
the neural network model is a VGG-19 model.

15. The computer-implemented method of claim 13, wherein
the neural network model is a sphereNet model.

16. The computer-implemented method of claim 11, further comprising pre-training a convolutional neural network by:
inputting a plurality of training low-resolution images into the convolutional neural network;
inputting a plurality of training reference images into the convolutional neural network;
generating a plurality of training high-resolution images using the generator respectively based on the plurality of training low-resolution images;
computing generator loss for the plurality of training high-resolution images respectively based on the generator loss function;
computing discriminator loss for the plurality of training high-resolution images respectively based on the discriminator loss function; and
tuning the convolutional neural network based on the generator loss and the discriminator loss.

17. An apparatus, comprising:
a memory; and
one or more processors;
wherein the memory and the one or more processors are connected with each other; and
the memory stores computer-executable instructions for controlling the one or more processors to:
input a low-resolution image into a generator; and
generate a high-resolution image using the generator based on the low-resolution image by processing the low-resolution image through a plurality of super-resolution generating units arranged in series in the generator;
wherein a respective output from a respective one of the plurality of super-resolution generating units has a respective increased image resolution as compared to a respective input to the respective one of the plurality of super-resolution generating units;
wherein the respective one of the plurality of super-resolution generating units comprises a super-resolution generating block and a bilinear interpolation block;
wherein the memory further stores computer-executable instructions for controlling the one or more processors to:
input a respective input to the super-resolution generating block and the bilinear interpolation block, respectively;
process the respective input using the super-resolution generating block to generate a first intermediate output from the super-resolution generating block;
input the first intermediate output from the super-resolution generating block to the bilinear interpolation block; and
generate a second intermediate output using the bilinear interpolation block based on the respective input and the first intermediate output;
wherein the super-resolution generating block comprises a plurality of encoding modules and a plurality of decoding modules arranged in a u-net architecture;
a respective one of the plurality of encoding modules comprises a down-sampling convolutional layer, and a plurality of first residual blocks arranged in series; and
a respective one of the plurality of decoding modules comprises a plurality of second residual blocks arranged in series, and an up-sampling convolutional layer.

18. A computer-program product comprising a non-transitory tangible computer-readable medium having computer-readable instructions thereon, the computer-readable instructions being executable by a processor to cause the processor to perform:
inputting a low-resolution image into a generator; and
generating a high-resolution image using the generator based on the low-resolution image;
wherein generating the high-resolution image comprises processing the low-resolution image through a plurality of super-resolution generating units arranged in series in the generator, wherein a respective output from a respective one of the plurality of super-resolution generating units has a respective increased image resolution as compared to a respective input to the respective one of the plurality of super-resolution generating units;
wherein the respective one of the plurality of super-resolution generating units comprises a super-resolution generating block and a bilinear interpolation block;
wherein generating the high-resolution image using the generator further comprises:
inputting a respective input to the super-resolution generating block and the bilinear interpolation block, respectively;
processing the respective input using the super-resolution generating block to generate a first intermediate output from the super-resolution generating block;
inputting the first intermediate output from the super-resolution generating block to the bilinear interpolation block; and
generating a second intermediate output using the bilinear interpolation block based on the respective input and the first intermediate output;
wherein the super-resolution generating block comprises a plurality of encoding modules and a plurality of decoding modules arranged in a u-net architecture;
a respective one of the plurality of encoding modules comprises a down-sampling convolutional layer, and a plurality of first residual blocks arranged in series; and
a respective one of the plurality of decoding modules comprises a plurality of second residual blocks arranged in series, and an up-sampling convolutional layer.

* * * * *